United States Patent Office 3,505,384
Patented Apr. 7, 1970

3,505,384
ISOCYANATO CARBONIC ACID ESTERS
Heinrich Krimm, Krefeld-Bockum, and Hermann Schnell, Krefeld-Uerdingen, Germany, assignors to Farbenfabriken Bayer Aktiengesellschaft, Leverkusen, Germany
No Drawing. Filed Mar. 25, 1966, Ser. No. 537,290
Claims priority, application Germany, Apr. 1, 1965, F 45,700
Int. Cl. C07c 69/00; C08g 41/04
U.S. Cl. 260—463                                     7 Claims

ABSTRACT OF THE DISCLOSURE

Isocyanato carbonic acid esters are prepared by treating a chloroformic acid ester isocyanate with an aqueous solution of an alkali metal hydroxide or an alkaline earth metal hydroxide in the presence of an inert organic solvent and a tertiary amine catalyst.

---

The invention relates to isocyanato carbonic acid esters and more particularly to a unique process for their preparation.

It is known to react the hydrochlorides of amino alcohols at moderate temperatures with phosgene and then further phosgenate the resulting aminoalkyl carbonates in the form of their hydrochlorides at elevated temperatures to produce the corresponding diisocyanato alkyl carbonates. This method can be used only for preparations using amino alcohols but not for those requiring amino-phenols since only alcoholic hydroxyl groups will react with phosgene at relatively low temperatures and in the absence of substances which bind hydrogen chloride. Therefore, to prepare carbonic acid esters of amino-phenols, dinitrophenol carbonates are reduced to diaminophenyl carbonates and the isocyanate groups are then introduced by phosgenating at elevated temperatures.

Both of these processes are subject to a common disadvantage: A carbonic acid ester diamine or the salt thereof must be subjected to a hot phosgenation whereby, through the simultaneous evolution of hydrogen chloride under the rigorous phosgenation conditions, ester cleavage is unavoidable. Another disadvantage inherent in both of these processes is the long reaction time and the occurrence of serious corrosion problems during phosgenation. Further, in some of the methods which have been proposed, all of which require a hot phosgenation, once the isocyanate is finally formed, the elevated temperature often causes it to convert into a resinous material.

It is therefore an object of this invention to provide a method for the preparation of compounds containing isocyanato groups as well as a carbonate group in the same molecule which is devoid of the foregoing disadvantages.

A further object of this invention is to provide a method for the preparation of isocyanato carbonates which does not require elevated temperatures.

A still further object of this invention is to provide a method for the preparation of isocyanato carbonates which does not require the preparation and purification of amines and amine salts before a satisfactory starting material can be obtained for the preparation of the desired product.

Another object of this invention is to provide a method for the preparation of isocyanato carbonic acid esters which requires such mild reaction conditions that side reactions cannot occur.

Yet another object of this invention is to provide an improved process for the preparation of materials particularly well-suited for use in the preparation of polyurethanes, including foams, coatings, elastomers, films, fibers and so on.

The foregoing objects and others which will become apparent from the following description are accomplished in accordance with this invention which, generally speaking, provides a method for the preparation of isocyanato carbonic acid esters which involves treating a chloroformic acid ester isocyanate at a low temperature with an aqueous solution of an alkali metal hydroxide or alkaline earth metal hydroxide in the presence of an inert solvent and a catalytic amount of a tertiary amine.

The process of this invention is graphically illustrated by the following equation which employs, for the sake of illustration, p-isocyanatophenyl chloroformic acid ester:

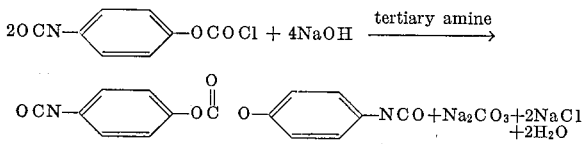

The smooth course of the reaction is surprising since isocyanates are extremely sensitive to water and react almost spontaneously with it, especially in the presence of basic catalysts, to give off carbon dioxide and form ureas. One would therefore expect a polyaddition reaction to take place with the formation of higher molecular weight products by the reaction between the isocyanate groups and water when the above reaction sequence occurs. That such is not in fact the case in the process of this invention is remarkable indeed. Even further, that the isocyanato carbonic acid esters can be prepared at low temperatures without side reactions or polymerization at very high yields is even more remarkable.

The chloroformic acid ester isocyanates which are suitable starting materials in the process of this invention are, for example, compounds of the following general formula

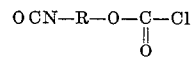

in which R denotes a divalent aliphatic, cycloaliphatic, aromtaic or araliphatic hydrocarbon radical, or mixtures of these as in an aryl-alkyl-aryl type radical. In particular R may be the divalent radical of a branched or unbranched alkane, preferably having 2 to 6 carbon atoms, or the divalent radical of an aromatic hydrocarbon such as benzene, naphthalene or diphenyl, which may be substituted by alkyl radicals. The radical NCO and the radical

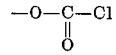

may be linked to the aromatic compound either directly or thorugh an alkyl radical.

Individual $CH_2$ groups of the alkane or alkyl radicals may also be replaced by oxygen atoms, and the alkane and the aromatic radicals may be substituted, preferably by halogen atoms such as chlorine.

The following are some specific examples of some suitable chloroformic acid ester isocyanates:

2-isocyanato-ethyl-chloroformic acid ester,
3-isocyanato-propyl-chloroformic acid ester,
4-isocyanato-benzyl-chloroformic acid ester,
4-isocyanato-phenylethyl-2'-chloroformic acid ester,
isopropylidene-phenyl-4-isocyanato-phenyl-4'-hydroxyethyl chloroformic acid ester,
3-isocyanato-phenyl-chloroformic acid ester,
4-isocyanato-phenyl-chloroformic acid ester,
4-isocyanato-2-methylphenyl-chloroformic acid ester,
3-isocyanato-4-methylphenyl-chloroformic acid ester,
4-isocyanato-2-chlorophenyl-chloroformic acid ester,
4-isocyanato-naphthyl-1-chloroformic acid ester,
5-isocyanato-naphthyl-1-chloroformic acid ester, 5-isocyanato-naphthyl-2-chloroformic acid ester,
8-isocyanato-naphthyl-2-chloroformic acid ester,
4-isocyanato-diphenyl-4'-chloroformic acid ester,
4-isocyanato-diphenylmethane-4'-chloroformic acid ester,
4-isocyanato-diphenylmethane-3'-chloroformic acid ester,
isopropylidene-phenyl-4-isocyanato-phenyl-4'-chloroformic acid ester,
isopropylidene-2-methyl-phenyl-4-isocyanato-phenyl-4'-chloroformic acid ester,
isopropylidene-3-methyl-4-isocyanato-phenyl-4'-chloroformic acid ester,
isopropylidene-3-chlorophenyl-4-isocyanato-phenyl-4'-chloroformic acid ester,
isopropylidene-3,3-dimethyl-phenyl-4-isocyanato-phenyl-4'-chloroformic acid ester,
isopropylidene-3,5-dichlorophenyl-4-isocyanato-phenyl-4'-chloroformic acid ester,
isopropylidene-5-methyl-phenyl-2-isocyanato-phenyl-4'-chloroformic acid ester,
isopropylidene-phenyl-4-isocyanato-phenyl-2'-chloroformic acid ester,
isopropylidene-phenyl-2,4-diisocyanato-phenyl-4'-chloroformic acid ester,
isobutylidene-phenyl-4-isocyanato-phenyl-4'-chloroformic acid ester,
cyclohexylidene-phenyl-4-isocyanato-phenyl-4'-chloroformic acid ester,
methylbenzylidene-phenyl-4-isocyanato-phenyl-4'-chloroformic acid ester and
3-(4'-isocyanato-phenyl)-1,1,3-trimethylindane-5-chloroformic acid ester and the like.

The chloroformic acid ester isocyanates to be used in this invention as starting materials may be prepared, for example, by the reaction between a primary amino alcohol of the formula $(H_2N)_m$—R—OH with excess phosgene in the presence of a tertiary amine and, if desired, in the presence of a solvent. In the formula R is a divalent susbtituted or unsubstituted aliphatic, cycloaliphatic, or aromatic group and $m$ is an integer of from 1 to 2.

Some suitable primary amino alcohols which may be used in the preparation of the chloroformic acid ester isocyanates are, for example, aminoethanol, 3-aminopropanol, 2-aminobutanol, 2-amino-2-methyl-propanol, 4-aminobenzyl alcohol, 4-aminophenyl-ethyl alcohol, 2,2-(4-amino-4-hydroxyethoxy-diphenyl)-propane, and further, aminophenols such as o-, m- and p-aminophenol, 3-amino-o-cresol, 4-amino-o-cresol, 5-amino-o-cresol, 4-amino-m-cresol, 6-amino-m-cresol, 2-amino-p-cresol, 3-amino - p - cresol, 2-chloro-4-aminophenol, 5-chloro-2-aminophenol, 2-aminonaphthol-1, 4-aminonaphthol-1, 5-aminonaphthol-1, 6-aminonaphthol-1, 8-aminonapthol-1, 1 - aminonaphthol - 2, 3 - aminonaphthol-2, 5-aminonaphthol-2, 7-aminonaphthol-2, 8-aminonaphthol-2, 4-amino-4' - hydroxydiphenyl, 4-amino-4'-hydroxydiphenylmethane, 4-amino-3'-hydroxydiphenylmethane, 2,2-(4-amino-4' - hydroxydiphenyl)-propane, 2,2-(4-amino-4'-hydroxy-2 - methyldiphenyl)-propane, 2,2-(4-amino-4'-hydroxy-3 - methyldiphenyl) - propane, 2,2-(4-amino-4'-hydroxy-3 - chlorodiphenyl) - propane, 2,2-(4-amino-4'-hydroxy-3,3' - dimethyldiphenyl) - propane, 2,2-(4-amino-4'-hydroxy - 3,5-dichlorodiphenyl) - propane, 2,2-(2-amino-4' - hydroxy-5-methyl-diphenyl)-propane, 2,2-(4-amino-2' - hydroxy-diphenyl)-propane, 2,2-(4-amino-2'-,4'-dihydroxy - diphenyl) - propane, 2,2-(2,4-diamino-4'-hydroxy - diphenyl)-propane, 2,2-(4-amino-4'-hydroxy-diphenyl) - butane, 1,1-(4-amino-4'-hydroxy-diphenyl)-cyclohexane, 1,1,1 - (4 - amino-4'-hydroxy-triphenyl)-ethane and 3-(4'-aminophenyl)-5-hydroxy-1,1,3-trimethylindane.

The catalytic agents suitable for the preparation of the chloroformic acid ester isocyanates are the tertiary amines such as, for example, trimethylamine, triethylamine, tributylamine, N,N-dimethyl cyclohexyl amine, N,N-dimethyl benzylamine, pyridine, quinoline and, in particular, N,N-dimethyl aliline and N,N-diethyl aniline.

Although a solvent is not required, it is preferred that that reaction be carried out in the presence of an inert solvent such as, for example, hydrocarbons such as benzene, toluene, and xylene, chlorinated hydrocarbons such as methylene chloride, chloroform, carbon tetrachloride, ethylene chloride, chlorobenzene, dichlorobenzene, chlorotoluene, dichlorotoluene, trichlorotoluene and chloronaphthalenes and esters such as ethyl acetate, propyl acetate and butyl acetate and the like.

One particularly suitable embodiment comprises dissolving carbonyl dihalide in an inert medium such as, for example, toluene, xylene, tetrahydronaphthalene, benzene, chlorinated aromatic solvents and hydrogenated aromatic hydrocarbons and the like and then adding a solution or suspension of a primary amino alcohol in a second quontity of the same medium dropwise. A tertiary amine is added to the reaction mixture along with the amino alcohol at the same rate as it is being used up in the reaction. The temperature of the reaction mixture during the addition of the primary hydroxyl amine is maintained in the range of from about −10° C. to about 50° C., preferably from about −10° C. to about 30° C. After the addition is complete, the temperature of the reaction mixture is elevated to about the reflux temperature of the inert medium, generally not much above about 150° C. The excess carbonyl dihalide is removed under vacuum, and the tertiary amine hydrohalide is removed by washing with ice water. The reaction product is then separated from the solution by the conventional purification techniques such as distillation, crystallization and the like.

In an alternative procedure, the solution or suspension of the primary amino alcohol is passed into the carbonyl dihalide solution at the reaction temperature together with the tertiary amine.

Generally, it is necessary to heat the reaction mixture to a temperature of about 150° C. or higher in order to complete the reaction. On completion of the reaction, the hydrohalide of the tertiary base, which is formed as a secondary product, is removed by successive washings with ice water. The reaction product is recovered from the solution by first concentrating the solution by evaporation or the like, followed by recrystallization or distillation.

In order to avoid condensation reactions, it is necessary to use an excess of carbonyl dihalide. In cases where the tertiary base is added dropwise, a small excess, in the region of from 5 to 50 percent, i.e. 1.05 to 1.5 mols of carbonyl dihalide per hydroxyl- or amino group, is generally sufficient.

Generally exactly two mols of tertiary amine per amino group and one mol of tertiary amine per hydroxyl group are used. If an excess of tertiary amine is used, it will give rise to a number of secondary reactions with excess carbonyl dihalide, particularly at elevated temperatures and will result in the formation of alkyl halides from aliphatic tertiary amines or nuclear acylation. In addition, an excess of tertiary amines may even give rise to the formation of dyes, especially in cases where aromatic tertiary amines are used.

Although reaction temperatures up to about 150° C. have been found desirable, temperatures below and above this range can be utilized. The particular temperature employed will be dependent in part upon the particular amino alcohol and solvent used. The optimum temperature at the beginning of the reaction may be in the range of from about −10° C. to about 30° C. After the tertiary amine has been added, the temperature may be increased to the point at which the solvent begins to reflux, but generally not beyond about 150° C.

In the process according to the invention for the preparation of isocyanato carbonic acid esters, the aqueous alkali metal hydroxide or alkaline earth metal hydroxide solutions employed may be a solution of sodium hydroxide or potassium hydroxide or a suspension of calcium hydroxide in water. Lithium, strontium or barium hydroxides can also be used. Although the concentration in which the hydroxides are employed and added to the reaction mixture, are almost limitless, that is, concentrations of from about 1 to about 50% are feasible, a concentration of about 10%, or in other words 2 N aqueous sodium hydroxide or potassium hydroxide is most preferable. The amount of hydroxide which should be present in the reaction mixture is easily calculated from the reaction equation along the lines of the above equation. Of course, any excess is possible.

Some specific examples of suitable inert organic solvents for the chloroformic acid ester isocyanate which may be used to prepare the isocyanato carbonic acid esters of this invention are hydrocarbons, such as ligroin, cyclohexane, benzene and toluene; chlorinated hydrocarbons such as methylene chloride, chloroform, carbon tetrachloride, ethylene chloride, tetrachloroethane and chlorobenzene, and ethers such as diethylether and diisopropylether, and the like and mixtures thereof.

Some specific examples of suitable catalysts which may be used in the preparation of the isocyanato carbonic acid esters are, for example, tertiary amines such as trimethylamine, triethylamine, tributylamine, N,N-dimethylcyclohexylamine, N,N-dimethylbenzylamine, N,N-dimethylaniline, pyridine, quinoline, N-methylmorpholine and N-methyldecahydroquinoline, N-ethylmorpholine, and triethylene diamine. The catalysts are preferably employed in concentrations of from about 0.1 to about 100 mg. per liter of the total reaction mixture.

A suitable temperature range for the preparation of the isocyanato carbonic acid esters of this invention lies between about $-5°$ and about 20° C., but preferably between about $-5°$ and 10° C.

The progress of the reaction can be followed titrometrically if desired. When the consumption of aqueous alkali metal hydroxide or alkaline earth metal hydroxide has reached an end, the reaction is complete.

The products of the process are generally obtained in a high degree of purity after separation of the aqueous layer, washing with water and concentration by evaporation. The product has an exceptionally high thermal stability and can therefore be distilled at a reduced pressure in most cases, with the use of a thin layer evaporator, if desired, without any loss in yield.

The isocyanato carbonic acid esters are valuable as intermediate products and may be used in the production of synthetic resins. Particularly, the isocyanato carbonic acid esters are valuable as reactants with a compound containing hydrogen atoms which are reactive with NCO groups in the preparation of polyurethanes of all types including coatings, elastomers, films, fibers and, with the addition of a blowing agent in the reaction mixture, foams.

The invention is further illustrated by the following examples in which all parts and percentages are by weight unless otherwise specified.

EXAMPLE 1

After the addition of about 10 drops of N,N-dimethylcyclohexylamine to a solution of about 315.5 parts (1 mol) of isopropylidene-phenyl - 4 - isocyanato-phenyl-4'-chloroformic acid ester in about 1 liter of methylene chloride, about 1 liter of 2 N sodium hydroxide solution is run into the aforementioned solution at about 0° C. in about 15 minutes while stirring vigorously and cooling with a freezing mixture. After about 5 more minutes, the heat produced by reaction subsides and, as titration of an aliquot portion shows, the saturation value of the alkali consumption is reached. The aqueous layer is separated, washed with ice water with the addition of a small amount of dilute hydrochloric acid and then with pure water until neutral, dried over sodium sulphate and the solvent is removed. The residue is heated to about 200° in a vacuum of about 10 mm. Hg; about 262 parts (99% of the theoretical) of a colorless, viscous reaction product is obtained which at room temperature has the consistency of a soft resin. It contains about 16.2% (calculated 15.8%) isocyanate. The amount of chlorine present as impurity is less than about 0.02%.

About 30 parts of this resin are distilled in a high vacuum. About 28 parts of a colorless, viscous fraction distilling over at about 300° to about 305° C. at about 0.1 mm. Hg are obtained, consisting of pure bis-(isopropylidene-diphenyl-4-isocyanato)-4'-carbonate.

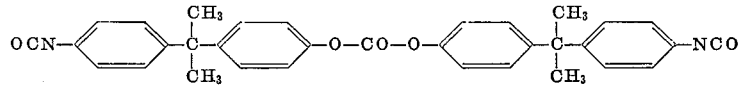

Calculated for $C_{33}H_{28}O_3N_2$ (532.6) (percent): C, 74.42; H, 5.30; NCO, 15.8. Found (percent): C, 74.68; H, 5.28; NCO, 16.1.

EXAMPLE 2

By the method of Example 1, about 330 parts (1 mol) of isopropylidene-5-methylphenyl - 2 - isocyanato-phenyl-4'-chloroformic acid ester are reacted with about 1 liter of 2 N sodium hydroxide solution with the addition of about 10 drops of triethylamine at about 0° C. during a reaction time of about one hour. After the removal of the solvent by evaporation, about 277 parts (99% of the theoretical) of a water-clear resin having an isocyanate content of about 15.2% (calculated 15.0%) are obtained.

The boiling point of bis-(isopropylidene-5-methyl-diphenyl-2-isocyanato)-4'-carbonate is about 304° to about 308° C. at about 0.08 mm. Hg.

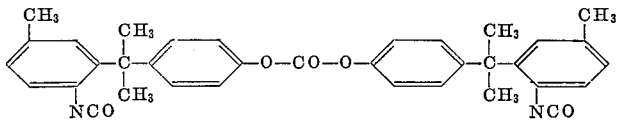

Calculated for $C_{35}H_{32}O_3N_2$ (560.6) (percent: C, 74.98; H, 5.75; NCO, 15.0. Found (percent): C, 74.79; H, 5.80; NCO, 14.9.

EXAMPLE 3

By the method of Example 1, about 344 parts (1 mol) of isopropylidene-3,5-dimethyl - phenyl - 4 - isocyanato-phenyl-4'-chloroformic acid ester are reacted with about 1 liter of 2 N sodium hydroxide solution with the addition of about 10 drops of N,N'-dimethylbenzylamine at about 5° C. during a reaction time of about 20 minutes. After removal of the solvent by evaporation, about 286 parts (98% of the theoretical) of a water-clear resin having an isocyanate content of about 14.8% (calculated 14.3%) remain behind.

The boiling point of bis-(propylidene - 3,5 - dimethyl-diphenyl - 4 - isocyanato)-4'-carbonate is about 308°–312° C. at about 0.05 mm. Hg.

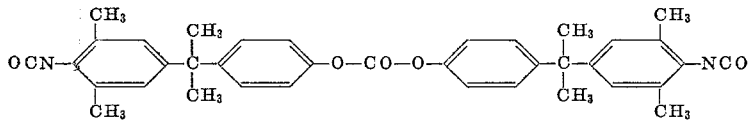

Calculated for $C_{37}H_{36}O_5N_2$ (588.7) (percent): C, 75.49; H, 6.16; NCO, 14.3. Found (percent): C, 75.57; H, 6.21; NCO, 14.1.

EXAMPLE 4

About 5 drops of N,N'-dimethylcyclohexylamine are added to a solution of about 179.5 parts (1 mol) of 4-isocyanato-phenyl-chloroformic acid ester in about 2 liters of methylene chloride, and about 1 liter of 2 N sodium hydroxide solution is then run into the above solution within a time of about 10 minutes at about —5° C. while stirring vigorously and cooling with a freezing mixture. The layers are separated immediately, dried over sodium sulphate and the solvent is distilled off. After the first fraction (about 30 parts) is obained at about 125° to 132° C. and about 12 mm. Hg consisting of unreacted starting material, di-(4-isocyanato-phenyl)-carbonate distills over at about 190° to about 195° C, and about 0.2 mm. Hg. Yield: 106 g.=85% based on reacted 4-isocyanato-phenyl chloroformic acid ester. Melting point: 150–151° C.

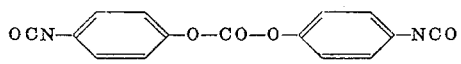

Calculated for $C_{15}H_8O_3N_2$ (296.2) (percent): C, 60.81; H, 2.72; NCO, 28.4. Found (percent) C, 60.87; H, 2.68; NCO, 28.6.

EXAMPLE 5

By the method of Example 1, about 356 parts (1 mol) of 3-(4'-isocyanato - phenyl) - 1,1,3 - trimethylindane-5-chloroformic acid ester are reacted with about 1 liter of 2 N sodium hydroxide solution with the addition of about 30 drops of N,N'-dimethylcyclohexylamine at about 0° C. during a reaction time of about 30 minutes. After removal of the solvent by evaporation, about 303 parts (99% of the theoretical) of a yellowish hard resin consisting of bis-(3-(4'-isocyanato - phenyl) - 1,1,3-trimethylindane)-5-carbonate having an isocyanate content of about 13.6% (calculated 13.75%) remain behind.

A 50 parts sample can be distilled without decomposition at about 318° to about 322° C. and about 0.2 mm. Hg.

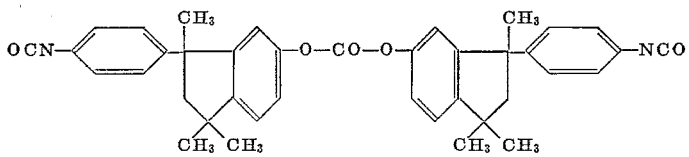

Calculated for $C_{39}H_{36}O_5N_2$ (612.7) (percent): C, 76.45; H, 5.92; NCO, 13.75. Found (percent): C, 76.37; H, 5.85; NCO, 13.51.

EXAMPLE 6

By the method of Example 1, about 186 parts (0.5 mol) of isopropylidene-5-methyl-phenyl - 2,4 - diisocyanato - phenyl-4'-chloroformic acid ester are reacted with about 500 cc. of 2 N sodium hydroxide solution with the addition of about 5 drops of dimethyl cyclohexylamine at about 0° C. during a reaction time of about 20 minutes. After removal of the solvent by evaporation, the reaction

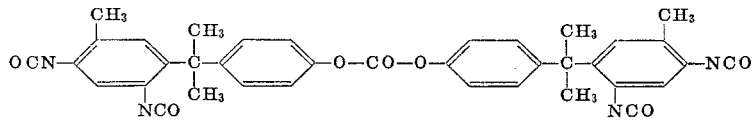

product bis-(isopropylidene - 5 - methyl-diphenyl-3,4-diisocyanato)-4'-carbonate remains behind as a tough, yellowish resin.

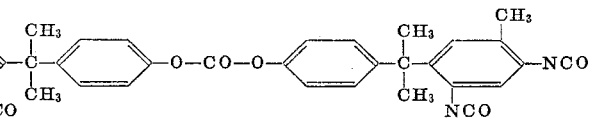

Calculated for $C_{37}H_{30}O_7N_4$ (642.6) (percent): C, 69.15; H, 4.71; NCO, 26.2. Found (percent): C, 69.70; H, 4.39; NCO, 26.5.

Although the invention has been described in considerable detail in the foregoing for the purpose of illustration, it is to be understood that variations can be made by those skilled in the art without departing from the spirit and scope of the invention except as set forth in the claims.

What is claimed is:

1. A method for the preparation of isocyanato carbonic acid esters which comprises treating a chloroformic acid ester isocyanate having the formula

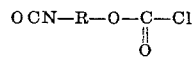

wherein R is a divalent radical selected from the group consisting of alkylene having from 2 to 6 carbon atoms, chlorine substituted alkylene having from 2 to 6 carbon atoms, phenyl, naphthyl, diphenyl alkane, triphenyl alkane, alkyl substituted phenyl, alkyl substituted naphthyl, alkyl substituted diphenyl alkane, alkyl substituted triphenyl alkane, chlorine substituted phenyl, chlorine substituted naphthyl, chlorine substituted diphenyl alkane, chlorine substituted triphenyl alkane, isocyanato substituted diphenyl alkane and 3-phenyl-1,1,3-trimethylindane in an inert organic solvent therefore and a catalytic amount of a tertiary amine catalyst at a temperature of from about —5° to about +20° C. with an aqueous solution of a member selected from the group consisting of an alkali metal hydroxide or an alkaline earth metal hydroxide.

2. The method of claim 1 wherein the aqueous constituent is selected from the group consisting of sodium hydroxide, potassium hydroxide or calcium hydroxide.

3. The method of claim 1 wherein the catalytic amount of tertiary amine is from about 0.1 to about 100 mg. per liter of the total reaction mixture.

4. The method of claim 1 wherein the concentration of the hydroxides is from about 1 to about 50 percent.

5. The method of claim 1 wherein the concentration of the hydroxide is about a 10 percent solution and the hydroxide is selected from the group consisting of sodium hydroxide or potassium hydroxide.

6. The method of claim 1 wherein the tertiary amine catalyst is selected from the group consisting of trimethylamine, triethylamine, tributylamine, N,N-dimethylcyclohexylamine, N,N-dimethylbenzylamine, N,N-dimethylaniline, pyridine, quinoline, N-methylmorpholine and N-methyldecahydroquinoline, N-ethylmorpholine and triethylene diamine.

7. The method of claim 1 wherein the chloroformic acid ester isocyanate is selected from the group consisting of 2-isocyanato-ethyl-chloroformic acid ester,
3-isocyanato-propyl-chloroformic acid ester,
4-isocyanato-benzyl-chloroformic acid ester,
4-isocyanato-phenylethyl-2'-chloroformic acid ester,
isopropylidene-phenyl-4-isocyanato-phenyl-4'-hydroxyethyl-chloroformic acid ester,
3-isocyanato-phenyl-chloroformic acid ester,
4-isocyanato-phenyl-chloroformic acid ester,
4-isocyanato-2-methylphenyl-chloroformic acid ester,
3-isocyanato-4-methylphenyl-chloroformic acid ester,
4-isocyanato-2-chlorophenyl-chloroformic acid ester,
4-isocyanato-naphthyl-1-chloroformic acid ester,
5-isocyanato-naphthyl-1-chloroformic acid ester,
5-isocyanato-naphthyl-2-chloroformic acid ester,
8-isocyanato-naphthyl-2-chloroformic acid ester,
4-isocyanato-diphenyl-4'-chloroformic acid ester,
4-isocyanato-diphenylmethane-4'-chloroformic acid ester,
4-isocyanato-diphenylmethane-3'-chloroformic acid ester,
isopropylidene-phenyl-4-isocyanato-phenyl-4'-chloroformic acid ester,
isopropylidene-2-methyl-phenyl-4-isocyanato-phenyl-4'-chloroformic acid ester,
isopropylidene-3-methyl-4-isocyanato-phenyl-4'-chloroformic acid ester,
isopropylidene-3-chlorophenyl-4-isocyanato-phenyl-4'-chloroformic acid ester,
isopropylidene-3,3'-dimethyl-phenyl-4-isocyanato-phenyl-4'-chloroformic acid ester,
isopropylidene-3,5-dichlorophenyl-4-isocyanato-phenyl-4'-chloroformic acid ester,
isopropylidene-5-methyl-phenyl-2-isocyanato-phenyl-4'-chloroformic acid ester,
isopropylidene-phenyl-4-isocyanato-phenyl-2'-chloroformic acid ester,
isopropylidene-phenyl-2,4-diisocyanato-phenyl-4'-chloroformic acid ester,
isobutylidene-phenyl-4-isocyanato-phenyl-4'-chloroformic acid ester,
cyclohexylidene-phenyl-4-isocyanato-phenyl-4'-chloroformic acid ester,
methylbenzylidene-phenyl-4-isocyanato-phenyl-4'-chloroformic acid ester and
3-(4'-isocyanato-phenyl)-1,1,3-trimethylindane-5-chloroformic acid ester.

References Cited

UNITED STATES PATENTS

| | | | |
|---|---|---|---|
| 3,170,946 | 2/1965 | Kilsheimer et al. | 260—463 |
| 3,184,494 | 5/1965 | Maeda et al. | 260—453 |
| 3,275,674 | 9/1966 | Bottenbruch et al. | 260—463 |
| 3,162,664 | 12/1964 | Brotherton | 260—463 |

OTHER REFERENCES

Carpenter, F. H., and Gish, D. T., J. Am. Chem. Soc., 74, 3818, 3820 (1952).

BERNARD HELFIN, Primary Examiner

L. J. DE CRESCENTE, Assistant Examiner

U.S. Cl. X.R

260—77.5, 2.5, 80.73, 858, 75